Figure 1:
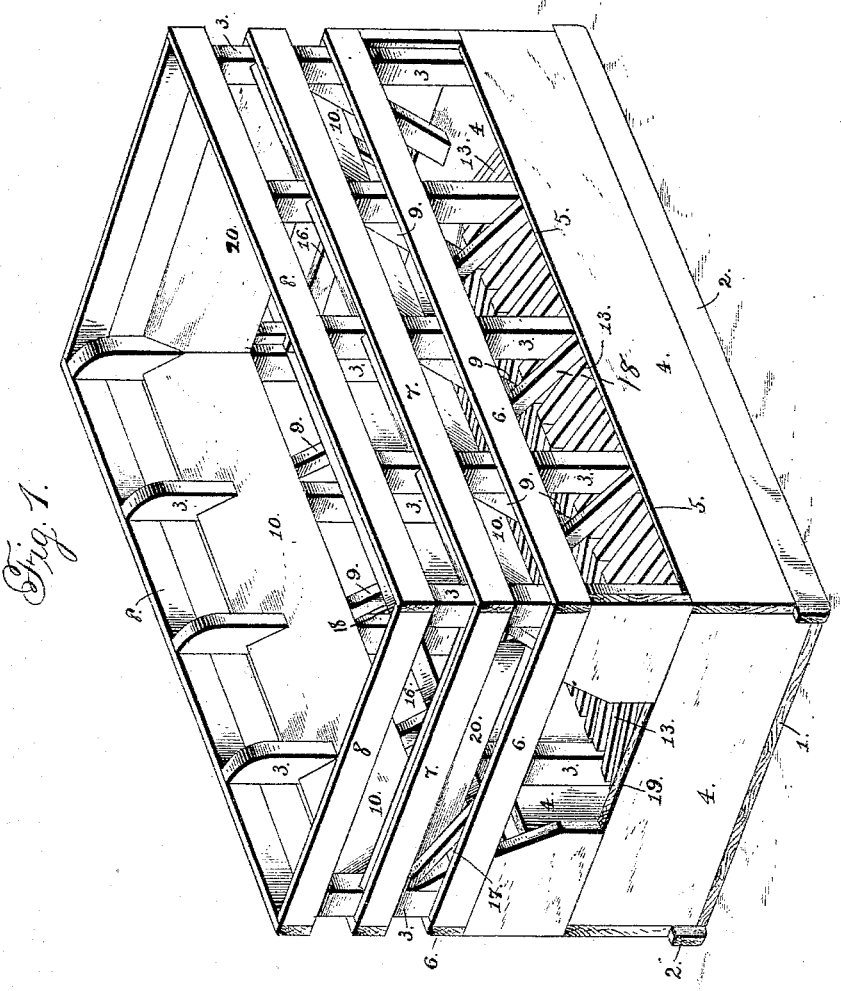

(No Model.) 2 Sheets—Sheet 1.

G. W. LIGHT.
FEED RACK.

No. 387,891. Patented Aug. 14, 1888.

Witnesses.
Jas. E. Hutchinson
J. A. Rutherford

Inventor.
George W. Light.
By his Attorney
James L. Norris.

(No Model.) 2 Sheets—Sheet 2.
G. W. LIGHT.
FEED RACK.
No. 387,891. Patented Aug. 14, 1888.
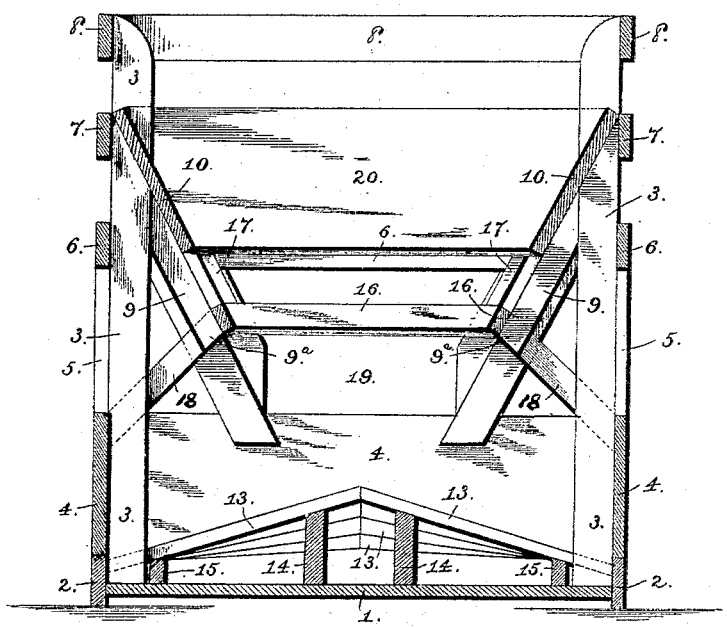
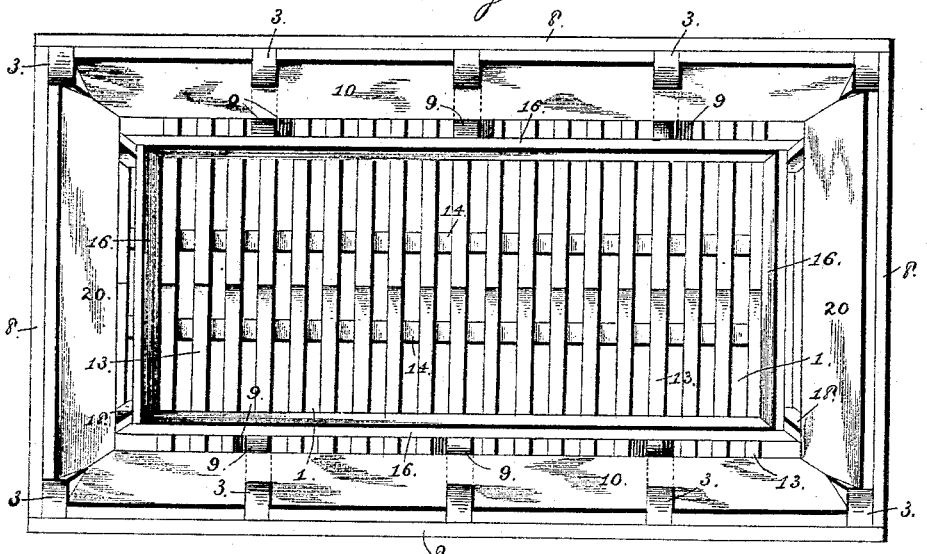
Witnesses. Inventor.
Jas. E. Hutchinson. George W. Light,
J. A. Rutherford. By his Attorney
James L. Norris.

UNITED STATES PATENT OFFICE.

GEORGE W. LIGHT, OF GALLATIN, MISSOURI.

FEED-RACK.

SPECIFICATION forming part of Letters Patent No. 387,891, dated August 14, 1888.

Application filed February 9, 1888. Serial No. 263,476. (No model.)

*To all whom it may concern:*

Be it known that I, GEORGE W. LIGHT, a citizen of the United States, residing at Gallatin, in the county of Daviess and State of Missouri, have invented new and useful Improvements in Hay-Racks, of which the following is a specification.

My invention relates to hay-racks for feeding stock, and the purpose thereof is to provide means whereby cattle may be fed in the open field or pasture during the winter.

It is the special purpose of my invention to provide a simple and comparatively inexpensive construction whereby waste of hay may be avoided, and whereby, also, those portions which are accessible to the cattle may be effectually protected from rain and snow and preserved in a dry and edible condition at all times.

It is my purpose, also, to provide a construction whereby the hay will automatically feed downward as it is consumed by the stock, and whereby all danger will be avoided of the hay choking in the rack or becoming so closely packed with foreign inedible matters or otherwise as to require the services of one or more stockmen in removing the superincumbent hay and clearing away the obstructing matter.

It is a further purpose of my invention to provide means whereby the seed which is scattered from the hay by the cattle may be preserved, and whereby, also, the stock may be compelled to take the hay from a point within the wall or manger surrounding the hay-rack and above the seed-rack, and at a point also below the point of greatest contraction of the hay-rack, the opposite sides of which are at such distance from each other as to provide for the complete consumption of the hay, to secure its regular and uniform descent within the rack, and to avoid its packing and choking therein by admixture with inedible substances or portions.

It is my purpose, finally, to simplify and improve the construction of this class of devices, to provide a hay-rack of diminished cost, greater durability, and superior utility, and to secure the greatest possible economy in the consumption of feed and the preservation of seed, and to avoid as far as possible the constant attention of stockmen and their services in clearing away obstructions in the feed-rack.

The invention consists in the several novel features of construction and new combinations of parts, hereinafter more fully set forth, and then definitely pointed out in the claim.

In the accompanying drawings, Figure 1 is a perspective view of a feed-rack embodying my invention. Fig. 2 is a vertical transverse section of Fig. 1. Fig. 3 is a plan view of the same.

In the said drawings, the reference-numeral 1 denotes the floor of the feed-rack, which for the sake of ready removal from place to place may be mounted upon runners 2. This flooring may be square or rectangular and of any desired form, the preferred dimensions being those hereinafter described.

Rising vertically from the flooring 1 at suitable intervals are posts 3, separated preferably by a space of about three feet to allow room for a steer to enter his head without difficulty. These posts rise to a height of about eight feet; but when the rack is adapted to the feeding of mules or other stock standing higher than steers this height may be correspondingly increased.

Rising from the flooring 1 and firmly attached to the outer faces of the posts 3 is a close boarding, 4, raised about two feet or two and one-half feet above the level of the floor and extending upon all sides of the rack. Above this boarding an open space, 5, is left between the posts 3, having a height of about two feet and bounded by a rail, 6, attached to said posts. Parallel rails 7 and 8 are also mounted on the posts at the same or other suitable intervals.

Upon the inner faces of the posts 3 I mount downwardly and inwardly inclined brackets 9 forming an angle with the said posts, which is preferably less than forty-five degrees. Upon these brackets are mounted horizontal strips 10, which are preferably placed close together, or substantially so, as shown, though it might be possible to form the same of a series of narrow strips separated by a slight interval from each other. By slotting the edges of the strips 10 to receive the posts 3 they may be extended upward and outward to or nearly to the outer faces of said posts, as shown in Fig. 2. The inner angles of the upper ends of the posts are also beveled off at a similar angle.

Upon the flooring 1 is placed the seed-rack, composed of parallel slats 13, having their inner ends mounted on suitable strips, 14, which run longitudinally of the hay-rack, and are raised above the flooring and their outer ends mounted on strips 15, of less height than the strips 14, whereby an outward inclination is given to the said strips, the central higher point of the seed-rack formed by them lying centrally of the hay-rack and longitudinally thereof. This rack is preferably made in sections to render it readily removable, and these sections may be of any desired extent or size. The outer ends of the slats 13 extend to or nearly to the outer boarding, 4, and the seed-rack is coextensive in length with the hay-rack.

The hay is thrown in at the open top of the rack and descends upon the strips 10 and upon the lower exposed ends, $9^a$, of the brackets, which are connected by a bar, 16, leaving an open space, 17, between said bar and the boarding of a foot or less and between the adjacent brackets 9 of about three feet. The lower ends of the brackets are supported by diagonal braces 18, connected to the posts 3, and are capable of supporting any weight. Descending through the most contracted portion of the rack, which is located at the lower exposed ends, $9^a$, of the brackets 9, the hay hangs within convenient reach of the cattle, which project their heads through the space 5 and seize that portion of the stack which hangs below the ends of said brackets. As they draw out the portion seized, the hay mingled therewith is also drawn downward, giving a full supply at all times and bringing said supply within reach of the stock. The waste that is drawn out with each withdrawal from the rack falls upon the flooring or on the seed-rack covering the same, and is thereby not only brought within easy reach of the stock, but is thrown where it can be entirely eaten up and be fully protected from the weather. By the construction shown, also, the seed from ripe grass—such as timothy and other varieties—will, when dislodged, fall through the seed-rack and lie upon the flooring 1, whence it may be removed at any time, the saving resulting from this source being of marked importance whenever ripe grass is fed. The stock cannot stand in the manger, neither is any material portion of the droppings of the hay wasted, nor is any part thereof exposed to rain or snow.

If desired, feed-openings 19 may be arranged beneath the end boards or racks, 20, and in this case the seed-rack is inclined downward toward the ends of the hay-rack also.

I have shown bars or rails 6 mounted on the posts 3 outside the same and above the feed-openings 5. Two or more similar bars, 7 and 8, may be added to the upper one to support the hay between the posts and the middle one to give additional strength and stability to the rack, while preventing the abstraction of hay from between the strips 10 and the upper rail.

It will be seen that by the construction presented the "mangers," as they are commonly termed, are brought within the wall of the rack instead of being projected outwardly therefrom. Thus the cattle are enabled to stand closely up to the circumscribing wall, and the droppings are all brought under an effectual shelter, as already mentioned. The rack also can by this arrangement be made of such dimensions transversely as to contain a proper quantity of hay for the number of mangers and still enable the stock to eat the contents out from each side to the central line, or so nearly so as to permit the hay to descend without obstruction. In all those cases where the mangers are arranged outside the frame the cattle must either stand in the mangers or troughs to reach the central part of the stack, or else they must stand so far back that they are unable to gain proper access thereto.

The rail 6 prevents the cattle from creeping into or standing in the manger, while the rails 7 and 8 prevent or tend to prevent the abstraction of hay save at and below the lower rail, 16, which connects the lower ends of the brackets 9.

What I claim is—

A hay-rack consisting of a rectangular flooring supporting upon two of its opposite sides a series of vertical posts, each being provided about midway of its length, upon its inner side, with a bracket formed of two oppositely-inclined and meeting parts, a boarding supported by the inclined parts of said brackets, constituting a rest for the hay and an open throat, and an outer inclosing-boarding secured to said posts and provided with openings beneath the throat of the hay-support, as set forth.

In testimony whereof I affix my signature in presence of two witnesses.

G. W. LIGHT.

Witnesses:
 Jos. L. Coombs,
 J. A. Rutherford.